United States Patent Office 3,492,253
Patented Jan. 27, 1970

3,492,253
PIGMENT COMPOSITIONS OF ALKYLATED POLYMERS OF HETEROCYCLIC N-VINYL MONOMERS AND USE OF SAME WITH OLEORESINOUS VEHICLES
Leon Katz, Springfield, N.J., and John J. Gaczi, Staten Island, N.Y., assignors to GAF Corporation, New York, N.Y., a corporation of Delaware
No Drawing. Filed July 6, 1966, Ser. No. 563,031
Int. Cl. C09c 3/02; C09b 67/00; C09g 39/08
U.S. Cl. 260—17
10 Claims

ABSTRACT OF THE DISCLOSURE

A pigmented composition especially adapted for incorporation in an oleo-resinous vehicle consisting essentially of
(a) a pigment in admixture with
(b) an alkylated polymer of a heterocyclic N-vinyl monomer, such polymer being present in an amount of at least 1% by weight based on the weight of the pigment.

---

This invention relates to a novel and useful composition of matter consisting of a pigment in admixture with an alkylated polymer of a heterocyclic N-vinyl monomer suitable for incorporation in oleoresinous vehicles.

The phrase "oleoresinous vehicles" is employed herein to refer to coating compositions, for example, drying oils, oleo resins, alkyd resins, paints, oil paints, enamels, spirit lacquers, varnishes, cellulose nitrate or cellulose acetate lacquers, litho varnish for printing inks, spirit varnishes or lacquers for printing inks, aqueous emulsions of natural or artificial latex, or aqueous solutions containing water soluble binders (glue, casein, methyl cellulose, polyvinyl alcohol, carboxymethyl cellulose, and the like) used in water paints.

Heretofore, it was customary when in incorporating organic or inorganic pigments in paints, lacquers, lithographic inks and other liquid compositions, to grind the pigment with the coating composition (or with one or more liquid components thereof) in a ball mill or on a "three-roller" mill to insure thorough dispersion of the pigment, avoid grains or specks in coatings produced therewith due to undispersed pigment particles or agglomerates, and to maintain or enhance the color strength of the pigment. However, these grinding operations are not only expensive and time consuming, but also necessitate the maintenance and use of heavy equipment.

To overcome these difficulties, it has been proposed in U.S. Patents 3,088,837 and 3,166,429, issued to General Aniline and Film Corporation, to utilize a pigment powder or pigment paste containing N-vinyl pyrrolidone and other pyrrolidone compounds. While the use of these pyrrolidone compounds contributed substantially to the advancement of the art, many problems have remained unsolved. For example, it is known that homopolymers of heterocyclic N-vinyl monomers, as well as the above mentioned pyrrolidone compounds are soluble in water and organic solvents such as alcohols, ether-alcohols, amines and other polar organic solvents, but insoluble in aliphatic hydrocarbons such as hexane, heptane, cyclohexane, methylcyclohexane, mineral spirits, mineral oil, lubricating oil, and other non-polar organic solvents. In view of these solubility characteristics, the use of such water-soluble compounds as dispersants for pigments suitable for incorporation in oleoresinous vehicles gives rise to the problem of separation and "bleeding-out" of the water-soluble compounds. Morever, it has been extremely difficult to obtain colored oleoresinous vehicles in deep shades and having strong covering power. Hence, satisfactory pigment compositions having a low degree of hygroscopicity and increased moisture resistance, along with the ability to impart increased color strength to an oleoresinous vehicle have long been sought.

We have now discovered that this problem and the above mentioned difficulties may be overcome by utilizing our novel pigment composition. Therefore, it is a principal object of this invention to provide a composition of matter consisting of a pigment in admixture with an alkylated polymer of a heterocyclic N-vinyl monomer suitable for incorporation in oleoresinous vehicles. It is also an object of this invention to provide oleoresinous vehicles containing the novel pigment composition as well as a method for their incorporation. Other objects and advantages will become manifest by the following description and claims.

The attainment of the above objects is made possible by the instant invention which consists of a novel composition of matter consisting of a pigment and an admixture of an alkylated polymer of a heteorcyclic N-vinyl monomer.

The polymers of heterocyclic N-vinyl monomers mixed with the pigment in practicing the present invention are those prepared by alkylation of a homopolymer or copolymer of a heterocyclic N-vinyl monomer, preferably a N-vinyl lactam monomer and most preferably N-vinyl pyrrolidone monomer with an alpha-olefin containing from 2 carbon atoms to 2000 carbon atoms, preferably in the range of from 2 to 200 carbon atoms, and most preferably in the range of from 8 to 42 carbon atoms, said alkylation process being more fully described in General Aniline and Film Corporation's copending patent application, Ser. No. 508,547, filed Nov. 18, 1965, now U.S. Patent 3,417,054 or by simultaneously polymerizing and alkylating a mixture containing a heterocyclic N-vinyl monomer, a monoethyenically unsaturated polymerizable monomer and an alpha-olefin containing from 2 carbon atoms to 2000 carbon atoms or a mixture of two different heterocyclic N-vinyl monomers and an alpha-olefin containing from 2 carbon atoms to 2000 carbon atoms, said simultaneous polymerization and alkylation process being more fully described in General Aniline and Film Corporation's copending patent application, Ser. No. 525,374, filed Feb. 7, 1966, now U.S. Patent 3,423,367.

As examples of heterocyclic N-vinyl monomers which contain a carbonyl function adjacent to the nitrogen in the heterocyclic moiety, whose alkylated polymeric derivatives produced as described in said applications, Ser. Nos. 508,547 and 525,374, may be employed in practicing the present invention may be mentioned N-vinyl succinimide, N-vinyl diglycolylimide, N-vinyl glutarimide, N-vinyl-3-morpholinone, N-vinyl-5-methyl - 3 - morpholinone, N-vinyl-5-ethyl-3-morpholinone, N-vinyl oxazolidone, etc., and N-vinyl ringoxygenated lactams as disclosed in United States Patent 3,231,548, and especially the N-vinyl 5-, 6- and 7-membered lactams, particularly N-vinyl pyrrolidone, characterized by the following formula:

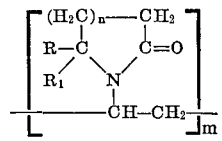

wherein R and $R_1$ are selected from the group consisting of hydrogen, methyl and ethyl, $n$ is an integer of from 1 to 3, and $m$ represents the average molecular weight as determined by relative viscoslty measurements which are designated as K values.

The viscosity coefficient, K, which is fully described in Modern Plastics, vol. 23, No. 3, pages 157–61, 212, 214, 216 and 218 (1945) is calculated as follows:

$$\frac{\log \eta_{rel}}{c} = \frac{75K_o^2}{1+1.5K_{oc}} + K_o \text{ and } K = 1000K_o$$

where $c$ is the concentration in grams per 100 ml. of polymer in solution and the $\eta_{rel}$ is the viscosity of the solution compared to solvent.

There may also be used the alkylated polymers of comparable monomers of N-vinyl 5-, 6- and 7-membered thiolactams, N-acryloylpyrrolidone, -piperidone and -caprolactam; N-acryloyl-5-methyl-pyrrolidone, N-acryloyl-6-methyl-piperidone and N-acryloyl-7-methyl caprolactam and their corresponding 5-, 6- and 7-ethyl derivatives; N-acryloxy-methyl-pyrrolidone, -piperidone and -caprolactam; N-methacryloxy-ethyl-pyrrolidone, -piperidone and -caprolactam; N-methacryloxy-methyl-5-methyl pyrrolidone, -6-methyl-piperidone and -7-methyl-caprolactam; N - methacrylamido - methyl-, N - methacrylamidoethyl-, N-methacrylamidopropyl- and N-(N-phenylacrylamidopropyl)-pyrrolidones, -piperidones and caprolactams.

The homopolymers of the N-vinyl lactams characterized by the foregoing formula (whose alkylated derivatives obtained, for example, as described in said application Ser. No. 508,547 are suitable for use in practicing the present invention) are readily obtained by homopolymerizing N-vinyl pyrrolidone; N-vinyl-5-methyl pyrrolidone; N-vinyl-5-ethyl pyrrolidone; N-vinyl - 5,5 - dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl - 7 - methyl-7-ethyl caprolactam.

For the purpose of the present invention we employ alkylated derivatives of homoploymers of heterocyclic N-vinyl monomers having a K value ranging from about 10 to 140, preferably from about 30 to 100. These homopolymers are readily obtained by conventional homopolymerization procedures of the foregoing heterocyclic N-vinyl monomers described in United States Patents 2,265,450; 2,317,804; 2,335,454 and many others too numerous to mention in which working examples are given.

All of the homopolymers of N-vinyl lactams characterized by the foregoing general formula are soluble in water, alcohols, and certain classes of organic solvents but insoluble in the aliphatic and aromatic hydrocarbons of the type hereinbefore mentioned.

Copolymers obtained by copolymerizing 5 to 99 mole percent of the foregoing heterocyclic N-vinyl monomers with 1 to 95 mole percent of a monoethylenically unsaturated polymerizable monomer and having a K value from about 10 to 140 are readily alkylated in accordance with the present invention to yield products having solubility characteristics dictated by the end use.

The various monoethylenically unsaturated polymerizable monomers, which are copolymerized with any one of the aforementioned heterocyclic N-vinyl monomers in the conventional manner and which will yield copolymers that are readily alkylated in accordance with said application Ser. No. 508,547, to produce alkylated copolymers suitable for use in practicing the present invention, include vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; vinyl ketones; vinyl cyclohexane; styrene; 2-vinyl pyridine, 4-vinyl pyridine; acrylic acid; acrylate ester monomers of the formula:

$$CH_2=CHCOOR_2$$

wherein $R_2$ represents either a straight or branched alkyl of from 1 to 18 carbon atoms or an alkoxyalkyl in which the total number of carbon atoms in the alkyl groups range from 3 to 6.

As examples of such acrylate esters the following are illustrative: methyl, ethyl, propyl, isopropyl, butyl, isobutyl, s - butyl, 2 - methyl - 1 - butyl, 3 - methyl - 1 - butyl, 2 - ethyl - 1 - butyl, amyl, 3 - pentyl, 2 - methyl - 1 - pentyl, 4 - methyl - 2 - pentyl, hexyl, 2 - ethyl - hexyl, heptyl, 2 - heptyl, octyl, 2 - octyl, nonyl, 5 - ethyl - 2 - nonyl, decyl, 2 - methyl - 7 - ethyl - 4 - undecyl, dodecyl, tetradecyl, hexadecyl, octadecyl, 2 - methoxyethyl, 2 - ethoxyethyl and 2 - butoxyetheyl acrylate; methacrylate monomers such as methacrylic acid, methyl methacrylate, cyclohexyl methacrylate, isobutyl methacrylate, isoamyl methacrylate, $\beta$ - methoxy ethyl methacrylate and $\alpha$ - (o-chlorophenyl) ethyl methacrylate, $\beta$ - phenoxy - ethyl methacrylate, $\alpha$ - phenyl ethyl methacrylate, phenyl methacrylate, o - cresyl methacrylate, p - cyclohexylphenyl methacrylate, 2 - nitro - 2 - methyl propyl methacrylate, diethylamino - ethylmethacrylate, ethylidene acetate methacrylate and glycidyl methacrylate, including esters of halo acrylic acids, such as methyl - 2 - chloro - acrylate, ethyl - $\alpha$ - chloro - acrylate, phenyl - $\alpha$ - chloro - acrylate, $\alpha$ - ethylacrylic acid; methacrylonitrile; N - alkyl and N - aryl substituted acrylamides such as N-methyl acrylamide, N - ethyl acrylamide, N - propyl acrylamide, N - n - butyl acrylamide, N - n - dodecyl acrylamide, N - n - octadecyl acrylamide, N,N - dimethyl acrylamide, N,N - diethyl acrylamide, N - N - di - n - butyl acrylamide, N - N - di - isobutyl acrylamide, N - cyclohexyl acrylamide, N,N - dicyclohexyl acrylamide, N - phenyl acrylamide, N-p - nitro - phenyl acrylamide, N - $\alpha$ - naphthyl acrylamide, N - $\beta$ - naphthyl acrylamide, N - methyl - N - phenyl acrylamide, N,N - diphenyl acrylamide, N - benzyl acrylamide, N,N - di - benzyl acrylamide; and grafted monomers of the type disclosed in United States Patents 3,029,219; 3,035,009; 3,036,033 and the like.

A mixture consisting of from 5 to 99 mole percent of any one of the foregoing heterocyclic N - vinyl monomers and from 1 to 95 mole percent of a different heterocyclic N - vinyl monomer, such as for example, N - vinyl lactam with either N - vinyl succinimide, N - vinyl - 3 - morpholinone, and the like, may also be copolymerized and the resulting copolymer alkylated for use in the present invention.

It is to be noted that any copolymer containing not less than 5 mole percent of the heterocyclic N - vinyl monomer and which is soluble in the organic solvent is readily alkylated in accordance with the present invention. From numerous experiments connected with the present invention, it has been found that the configuration of the foregoing monoethylenically unsaturated monomers, and numerous others, is immaterial since they all copolymerize in the aforementioned proportions with the heterocyclic N - vinyl monomers and yield copolymers which are soluble in the organic solvent or mixture thereof and which are readily alkylated.

With regard to the $\alpha$-olefins employed for producing the alkylated polymers used in practicing this invention, it is to be noted at the outset that any $\alpha$-olefins having a molecular weight from about 28 to as high as about 28,000, may be employed as the alkylating agent for the alkylated polymers of the various heterocyclic N - vinyl monomers. As examples of such $\alpha$ - olefins, the following are illustrative: ethylene, propylene, 1 -butene, 1 - pentene, 2 - ethyl - 1 - butene, 2 - methyl - 1 - pentene, 1 - hexene, 5 - methyl - 1 - hexene, 2 - methyl - 1 - pentene, 3 - ethyl - 1 - pentene, 1 - heptene, 1 - octene, 1 - nonene, 2 - ethyl - 1 - hexene, 1 - decene, 1 - dodecene, 1 - tetradecene, 1 - hexadecene, 1 - heptadecene, 1 - octadecene, 1-nonadecene, 1-eicosene, 1-docosene, 1-tetracosene, 1-pentacosene and polybutenes of molecular weight of 400 to 2500 may be employed.

While linear α-olfins are preferred because of their commercial availability, numerous isomers of α-olefins ranging from 1-pentene to 1-pentacosene as well as polybutenes may also be employed in the alkylation reaction. The only requirement in such case is that the isomer contained an ethylenic unsaturation in the α position thereof.

Instead of employing any one of the foregoing individual α-olefins, a mixture of commercially available linear α-olefins produced by cracking petroleum wax or by polymerizing lower olefins may also be used as the alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and may be used. A mixture of α-olefins containing from 65 to 75 percent of α-olefins of from $C_{20}$ to $C_{42}$ carbon atoms having an average molecular weight of 366 is also commercially available and such mixture is employed in the alkylation reaction.

Pigments suitable for use in the instant compositions of this invention include both inorganic pigments such as titanium oxide, carbon black, chrome yellow, ultra marine blue, lithophone, oxide yellow and the like, as well as organic pigments such as phthalocyanine greens, phthalocyanine blues, carmine red, and the like, as well as mixtures thereof, hitherto incorporated in the above mentioned oleoresinous vehicles and other similar coating compositions. These pigments are available normally in finely divided form, obtained, for example, by precipitation from solution, pulping, acid pasting, and finely grinding in dry form. Dry powdered pigments thus obtained, are in a substantially uniformed fine state of subdivision.

The quantity of such alkylated polymers of heterocyclic N-vinyl monomers employed for a given amount of pigment should be at least sufficient to deflocculate pigment agglomerates when mixed in with the color in the medium in which the color is suspended.

Quantities of said alkylated polymers used in excess of the aforesaid minimum are not critical, but for the purpose of convenience and economy, the amounts generally employed advantageously range from 0.01 up to 2–3 times the weight of the pigment and are preferably from about 1 to 100 parts, per 100 parts by weight of the pigment.

The resultant pigment composition of this invention may easily be directly incorporated into the above mentioned oleo-resinous vehicles in any desired manner, such as by simple milling or dry mixing. Alternatively, the pigment and alkylated polymer composition can be first diluted with a solvent compatible with the resinous coating composition, and the resultant slurry stirred into the resinous coating composition, or if desired, the alkylated polymer per se, may be incorporated into the oleoresinous vehicle first and then the pigment added separately later on. The quantity of pigment composition in the final pigmented oleoresinous vehicle naturally will depend only upon the intended use of the pigmented vehicle, and the convenience in handling the pigmented composition subject to incorporation. Regardless of the manner in which the alkylated polymers of the heterocyclic N-vinyl monomers are incorporated into the oleoresinous vehicles, the pigmented compositions are evenly and rapidly distributed throughout the oleoresinous vehicles giving a uniformly pigmented product free from specks, grains, streaking and mottling. Moreover, the color strength of the pigmented oleoresinous vehicle, that is its covering power and depth of color, is substantially higher than the one colored with the same pigment which has not been treated with the instant alkylated polymers. This unobvious and surprising increase in tinctorial strength is manifest by the fact that even pigments treated with unalkylated polyvinyl pyrrolidone or unalkylated copolymers of polyvinyl pyrrolidone do not produce this effect when incorporated into oleoresinous vehicles. Furthermore, there is no separation or bleeding out of the alkylated polymers from the pigmented oleoresinous vehicles, since these alkylated polymers, unlike the previously used pyrrolidone compounds and monomers are water-insoluble, but soluble in organic non-polar solvents such as aliphatic hydrocarbons, mineral and lubricating oils, etc. Thus, difficult to color oleoresinous vehicles are achieved by the use of our novel pigment compositions.

The following examples are illustrative of the present invention and are not to be regarded as limitative. It is to be understood that all parts, percentages and proportions referred to herein and in the appended claims are by weight unless otherwise indicated. The alkylated polymers used in the following examples were prepared either according to the procedure disclosed in said patent application, Ser. No. 508,547, or in said patent application, Ser. No. 525,374.

EXAMPLE I

A series of pigment compositions were prepared by admixing 100 parts by weight of pigment with 1 to 100 parts by weight of various alkylated polymers of a heterocyclic N-vinyl monomer in accordance with the invention to form paste suitable for incorporation in oleoresinous vehicles. The pigmented compositions are shown in the following table:

TABLE I

| | Pigment | Heterocyclic N-vinyl monomer | α-Olefin |
|---|---|---|---|
| A | Phthalocyanine Blue | 1 mol N-vinyl pyrrolidone K-90 | 1 mol α-eicosene. |
| B | do | 0.5 mol N-vinyl pyrrolidone K-90 | 0.35 mol α-eicosene. |
| C | do | do | 0.375 mol α-eicosene. |
| D | Phthalocyanine Green | 1.0 mol N-vinyl pyrrolidone K-90 | .50 mol Chevron (a mixture of $C_{12}$–$C_{20}$ α-olefins). |
| E | do | 0.7 mol N-vinyl pyrrolidone K-30 | 0.56 mol α-decene. |
| F | do | 0.5 mol N-vinyl pyrrolidone K-30 | 0.377 mol—66% α-hexadecene, 34% α-octadecene. |
| G | do | 0.25 mol N-vinyl pyrrolidone K-30 | 1 mol α-dodecene. |
| H | do | 1 mol N-vinyl pyrrolidone K-30 | 1 mol α-tetradecene. |
| I | do | 1 mol N-vinyl-5-methyl pyrrolidone K-35. | 1 mol α-eicosene. |
| J | do | 100 g. copolymer (70% N-vinyl caprolactam/30% N-vinyl-5-methyl pyrrolidone). | 1 mol α-octadecene. |
| K | do | 1 mol N-vinyl-2-pyrrolidone, 0.45 mol vinyl acetate. | 1.5 mol α-hexadecene. |

The above pigment compositions are characterized by their water insolubility and are all suitable for incorporation in oleoresinous vehicles to form uniform pigmented coating compositions. Of course, similar pigment compositions may be prepared by interchanging the pigments and alkylated polymers or by utilizing mixtures of more than one pigment and/or more than one alkylated polymer as well as by substituting any of the other various alkylated polymers mentioned in the instant specification and coming within the purview of this invention.

As examples of preferred pigments that may be substituted for the phthalocyanine pigments in the above compositions are Milori Blue, Chrome Oxide Green, Toluidine Red, Dioxazine Violet, Chlorinated Isoviolanthrone, Lithol Red 2G, Chrome Green, carmine azo pigment from coupling o-anisidine-5-sulfondiethylamide with 2-hydroxy-3-naphthoic acid -5′ chloro-2′,4′- dimethoxyanilide, yellow condensation products of 2-hydroxynaphthaldehyde with hydrazine, Lemon Ochre (ferric oxide), chlorinated and bromoinated derivatives of copper phthalocyanine, copper phthalocyanine blue, red azo pigment from coupling tetrazotized dianisidine with 1-phenyl-3-methyl-pyrazolone-5, yellow monoazo pigment from coupling diazotized p-chloro-o-nitraniline with acetoacet-o-chloroanilide, orange diazo pigment from coupling tetraozotized 2,2'-dichlorobenzidine with 1-phenyl-3-methyl-pyrazolone-5, red barium lake of azo dye from coupling diazotized m-toluidine-sulfoacid with beta-naphthol, Pigment Orange (lead chromate molybdate), Sudan Orange RA, Anthraquinone Red MR, Sudan Blue GA, carbon blacks and titanium dioxides.

Other preferred alkylated polymers that may be utilized in place of the alkylated polymers present in the above compositions are such alkylated polymers as N-vinyl pyrrolidone K–90 alkylated with 1-decene, ethylene, 1-butene or 1-octene; N-vinyl piperidone alkylated with 1-dodecene; a copolymer of N-vinyl piperidone (70%)/vinyl acetate (30%) alkylated with 1-eicosene; N-vinyl-ε-caprolactam alkylated with 1-hexadecene; copolymer of N-vinyl-ε-caprolactam (80%)/ethyl acrylate (20%) alkylated with 1-dodecene; N-vinyl pyrrolidone K–30 alkylated with a mixture of α-olefins containing from 65 to 75% of $C_{22}$–$C_{42}$ carbon atoms having an average molecular weight of 395; as well as alkylated polymers formed by simultaneously polymerizing and alkylating N-vinyl-2-pyrrolidone, dimethylaminoethylmethacrylate, and α-eicosene; N-vinyl-2-piperidone, N-vinyl-3-morpholinone and α-octadecene; and N-vinyl caprolactam, ethyl acrylate and α-dodecene.

EXAMPLE II

Two parts of 100% pigment, phthalocyanine green as a presscake were flushed with two parts of alkylated polyvinyl pyrrolidone, obtained by alkylating N-vinyl pyrrolidone K–90 with Chevron (a mixture of $C_{12}$–$C_{20}$ α-olefins), on a stainless steel plate. The term "flushed" indicates that the water coating the pigment was replaced by the alkylated polyvinyl pyrrolidone. The remaining traces of water were removed by drying on a steam plate at about 70–80° C. The flushed pigment composition was then incorporated into an alkyd resin by use of a Hoover Muller. The resultant pigment composition was characterized by its excellent tinctorial strength, the uniform distribution of pigment throughout the resin and the resins freedom from color streaks, mottling and pigment grains. Moreover, this coated resin sample, when compared on an equal pigment basis with a sample of the same resin colored with the original untreated pigment lacking any alkylated polymer, exhibited a large increase of tinctorial strength.

EXAMPLE III

A series of color lacquer samples were prepared by incorporating in each case, 0.5 g. of colored pigment in a quantity of nitro cellulose lacquer having the following composition:

| | G. |
|---|---|
| RS nitrocellulose (½ sec.) | 16.2 |
| Glyptal resin (ethylene glycol-phthalic anhydride condensate) | 7.4 |
| Methanol | 12.0 |
| Ethanol | 16.8 |
| Butanol | 5.8 |
| Ethylacetate | 14.0 |
| Butylacetate | 3.9 |
| Toluene | 5.4 |
| Xylol | 4.0 |
| Dibutyl phthalate | 4.6 |

The pigment compositions employed were compositions A, D and F of Example I. The coatings produced by this procedure exhibited high tinctorial strength and uniform dispersion of the pigment.

EXAMPLE IV

Two examples of pigmented vinyl lacquer were prepared by mixing in each case, 0.5 g. of a pigment composition with a vinyl lacquer having the following composition:

| | G. |
|---|---|
| Vinylite VYHH (a copolymer of vinyl chloride and vinyl acetate) | 16 |
| Methyl-isobutyl-ketone | 17 |
| Di-n-amyl-ketone | 9 |
| Toluene | 18 |

The pigments employed were A and D of Example I. These pigmented samples were coated on aluminum paper and exhibited high tinctorial strength and uniform coloration.

EXAMPLE V

Pigmented litho varnish samples were prepared by adding 50 mg. of pigmented composition to 5 g. of litho varnish consisting of two parts of zinc oxide and one part of bodied linseed oil varnish. Each sample was blended with a spatula on the base plate of a Hoover automatic muller (ASTM D–387–52T) in which each sample was subjected to 4 cycles of 25 revolutions each at 150 lbs. of pressure. The pigment compositions employed were compositions A and B of Example I. Draw-downs were then made for each sample and exhibited excellent tinctorial strength.

EXAMPLE VI

Three samples of a pigmented alkyd resin lacquer were prepared by incorporating 20 g. of pigment composition (pigment compositions A, D and F of Example I) in a mixture of 200 g. of an alkyd base resin (prepared from 42% soya bean oil, 42% phthalic anhydride and 16% glycerine) with 70 g. of xylol. 10 g. of each of the resulting coated resin compositions were let down in 40 g. of an enamel composed of titanium oxide, 4% cobalt naphthenate, 22% mineral spirit and 16% of the aforesaid base resin. The coatings produced by this procedure exhibited high tinctorial strength and uniform dispersion of the pigment.

EXAMPLE VII

Two parts of the pigment composition (composition D of Example I) were incorporated into 100 parts of nitrocellulose lacquer having the following composition:

| | Parts |
|---|---|
| RS nitrocellulose ½ sec. | 27 |
| Glycerol-phthalate alkyd resin | 12.4 |
| Ethanol | 14.5 |
| Butanol | 9.5 |
| Ethyl acetate | 15.7 |
| Butyl acetate | 6.5 |
| Xylol | 6.6 |
| Dibutylphthalate | 7.7 |

The resultant lacquer was coated on aluminum foil and allowed to dry, the coating hardened a brilliant green shade.

Similar results may be obtained by substituting other oleoresinous vehicles for the above nitrocellulose lacquer such as vinyl resin lacquer, drying oil varnishes, litho varnish, phenolic and alkyd resin modified varnishes, alkyd solvent paints, etc.

EXAMPLE VIII

In order to demonstrate that the instant alkylated-polymer/pigmented compositions, when incorporated to an oleoresinous vehicle, will result in uniform pigmented oleoresinous vehicles, that are not only substantially free from specks, grains, streaking or mottling, but which also exhibit a substantial increase in color strength, the following comparative tests were run.

Following the identical procedure in each run, 5 phthalocyanine green presscakes each underwent a 50% flushing with a different dispersing agent. The first presscake was flushed with the alkylated polymer, N-vinyl pyrrolidone K–90 alkylated with Chevron (a mixture of $C_{12}$–$C_{20}$ α-olefins); the second with raw linseed oil; the third with N-vinyl pyrrolidone/vinyl acetate copolymer; the fourth with an alkyd resin and the fifth presscake with polyvinyl pyrrolidone K–90. 0.500 g. of each of the above treated pigments were dispersed in 50.0 g. of a high lustre enamel.

A comparison of the results showed, even upon a mere visual inspection, that the oleoresinous vehicle colored with the pigment treated with the instant alkylated polymer (the first presscake) exhibited an increase in color strength that was at least twice as high as each oleoresinous vehicle colored with the pigment compositions (presscakes two to five) that were treated with the unalkylated dispersants.

Various modifications and variations of this invention will be obvious to a worker skilled in the art and it is understood that such modifications and variations are to be included within the purview of this application and the spirit and scope of the appended claims.

We claim:
1. A pigmented composition consisting essentially of
   (a) a pigment in admixture with
   (b) at least 1% by weight, based on said pigment, of an alkylated polymer containing at least one kind of the following kinds of units

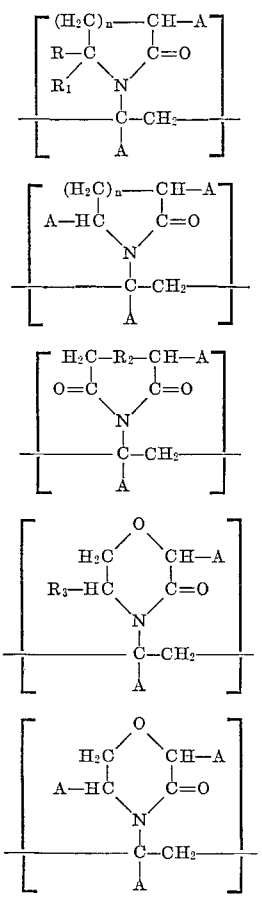

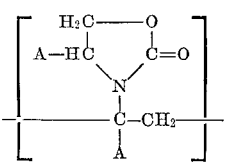

wherein R and $R_1$ are hydrogen, methyl or ethyl groups independently of each other, $R_2$ is an uninterrupted covalent bond, an oxygen atom or a $CH_2$ group, $R_3$ is a methyl group or an ethyl group, $n$ is a cardinal number of from 1 to 3, and wherein at least one of the symbols A in each unit designates an alkyl group having from 6 to 180 carbon atoms, the balance of the groups designated with the symbol A being hydrogen, and wherein said polymer is a homopolymer of the said kinds of units or is a copolymer thereof with 1 to 95 mol percent of at least one monoethylenically unsaturated co-monomer other than said units.

2. The pigmented composition of claim 1, wherein said monoethylenically unsaturated co-monomer is at least one of the following compounds: acrylamides, acrylic acid, esters of acrylic acid, acrylonitrile, methacrylonitrile, methacrylic acid, esters of methacrylic acid, vinyl esters, vinyl ketones, vinylpyridine, vinylcyclohexane, and styrene.

3. The pigmented composition of claim 9 wherein those alkyl groups that are designated with the symbol A, contain between 8 and 42 carbon atoms.

4. The pigmented composition of claim 9, wherein in each of the said units the groups designated with A comprise at least 5% of the unit.

5. A composition of matter consisting of a mixture of an oleoresinous vehicle and a pigment alkylated polymer composition as defined in claim 9.

6. A composition of matter consisting of a mixture of an oleoresinous vehicle and a pigment alkylated polymer composition as defined in claim 3.

7. A composition of matter consisting of a mixture of an oleoresinous vehicle and a pigment alkylated composition as defined in claim 4.

8. A composition of matter consisting of a mixture of an oleoresinous vehicle and a pigment alkylated polymer composition as defined in claim 2.

9. The pigmented composition of claim 2, wherein those alkyl groups that are designated with the symbol A, contain between 8 and 42 carbon atoms.

10. The pigmented composition of claim 2, wherein in each of the said units the groups designated with A comprise at least 5% of the unit.

References Cited

UNITED STATES PATENTS

| | | | |
|---|---|---|---|
| 3,417,054 | 12/1968 | Merijan et al. | 260—875 |
| 2,982,762 | 5/1961 | Voeks et al. | 260—88.3 |
| 3,166,429 | 1/1965 | Wich | 106—176 |

WILLIAM H. SHORT, Primary Examiner

T. PERTILLA, Assistant Examiner

U.S. Cl. X.R.

106—48, 137, 148, 176, 220, 228, 241, 308; 117—128.4; 260—4, 29.1, 8, 23, 32.8, 41, 37, 40

PO-1050
(5/69)

UNITED STATES PATENT OFFICE
CERTIFICATE OF CORRECTION

Patent No. 3,492,253     Dated January 27, 1970

Inventor(s) LEON KATZ ET AL

It is certified that error appears in the above-identified patent and that said Letters Patent are hereby corrected as shown below:

Column 10, lines 28, 31, 36, "9" should read -- 1 --.

Signed and sealed this 19th day of September 1972.

(SEAL)
Attest:

EDWARD M. FLETCHER, JR.
Attesting Officer

ROBERT GOTTSCHALK
Commissioner of Patents